3,359,240
COPOLYMERS CONTAINING PHENYLVINYLENE
CARBONATE
Dale J. Hubbard, Bay City, and Leo R. Morris, Midland, Mich., assignors to The Dow Chemical Company, Midland, Mich., a corporation of Delaware
No Drawing. Filed Jan. 14, 1963, Ser. No. 251,059
8 Claims. (Cl. 260—63)

This invention relates to copolymers of phenylvinylene carbonate and monoethylenically unsaturated compounds and methods for preparing the copolymers.

Many polymers and particularly the homopolymers have undesirable properties which render them unsuitable for some uses. Some of the thermoplastic polymers having high heat distortion values are too brittle and have low impact resistance whereas others having suitable impact resistance have poor heat distortion properties and low tensile strength. These properties can be improved in some instances by copolymerization with other monomers. Unfortunately an improvement of one property often is accompanied by the degradation of another property. Comonomers which improve heat distortion or tensile strength frequently reduce impact resistance. Also a high impact copolymer may have excessive elongation.

We have discovered that a particular monomer can be copolymerized easily with one or more other monomers to produce a copolymer having properties highly superior to those of a homopolymer of the other monomer. We have found that copolymers of monoethylenically unsaturated compounds and phenylvinylene carbonate (1-phenyl-1,2-ethenediol cyclic carbonate) have improved heat stability with little or no decrease in other desirable properties.

One of the advantages of our invention is that copolymers having the desired physical characteristics within a broad range may be obtained by careful selection of the comonomer and the quantity thereof for copolymerization with phenylvinylene carbonate. A further advantage is the ease with which the copolymerization may be conducted. Additionally the reaction may be conducted in the presence of a catalyst at pressures no greater than the vapor pressure of the monomers at the reactor temperature.

Phenylvinylene carbonate is a fragrant, near-white solid having a melting point near 80° C. It is insoluble in water and petroleum ether, moderately soluble in methanol and carbon tetrachloride and highly soluble in benzene, dioxane and acetone. The compound has been prepared from phenylethylene carbonate by chlorination followed by either dehydrochlorination or zinc dehalogenation. The preparation is described in copending application Ser. No. 119,036, Morris, filed June 23, 1961.

The copolymers of our invention can be prepared by bulk copolymerization of the monomers in the presence of a catalyst. With compounds having conjugated unsaturation such as the styrenes, it is desirable to conduct the polymerization at moderate temperatures over a period between about 6 and 24 hours to obtain the best copolymer structure. A reaction schedule wherein the temperature is maintained at 75–85° C. for 16 hours then at 120–175° C. for four hours converts between 95 and 98 percent by weight of the monomers to the copolymer. Also high reaction pressure is not required, the vapor pressure of the components providing an adequate pressure level.

Ethylenically unsaturated monomers which can be polymerized with a free radical catalyst may be copolymerized with phenylvinylene carbonate according to our invention. Among these are styrene, vinyl toluene, α-methylstyrene, o-chlorostyrene, acrylonitrile, vinyl chloride, vinylidene chloride, methyl acrylate, ethyl acrylate, methyl methacrylate, and other monomeric acrylate and methacrylate compounds, vinyl acetate, vinyl propionate and methyl vinyl ketone.

Catalysts which promote the formation of free radicals may be used in these copolymerizations. Suitable catalysts include the peroxides such as benzoyl, lauroyl, and tert. butyl peroxide, cumene hydroperoxide as well as the inorganic agents such as hydrogen peroxide, potassium persulfate, the perborates, etc. and the azo-type compounds such as azobisisobutyronitrile and diazoaminobenzene.

The following examples illustrate our invention.

Example 1

Six samples containing phenylvinylene carbonate and vinyl acetate in proportions ranging from 100 percent phenylvinylene carbonate to 100 percent vinyl acetate were prepared for solution polymerization in acetone. These mixtures of monomers were placed in glass tubes along with 1.0 percent azobisisobutyronitrile as a catalyst and sealed under a nitrogen atmosphere. The tubes were placed in an 80° C. oven for 18 hours. Thereafter the temperature was raised to 98° C. for an additional six hours. The samples were then removed and more acetone added to each before precipitating the polymer in ether. The properties and compositions of the polymers are shown in Table I.

TABLE I.—PHENYLVINYLENE CARBONATE (A)-VINYL ACETATE COPOLYMER

| Sample | Mole Fraction (A) in Monomers | Mole Fraction (A) in Polymers | Polymer Softening Point, ° C. |
|---|---|---|---|
| 1 | 0 | 0 | |
| 2 | 0.1 | 0.5 | 200 |
| 3 | 0.2 | 0.8 | 200 |
| 4 | 0.4 | 0.87 | 270 |
| 5 | 0.8 | 0.97 | 303 |
| 6 | 1.0 | 1.0 | 310 |

From these data it can be seen that phenylvinylene carbonate polymerizes easily and enters the polymer structure more readily than vinyl acetate as evidenced in the greater concentration of phenylvinylene carbonate in the polymer than in the corresponding monomer solution. The softening points of the polymers are substantially greater than that of the vinyl acetate homopolymer which is below room temperature.

Example 2

Six samples containing phenylvinylene carbonate and styrene were prepared for solution copolymerization in toluene in a manner similar to that of Example 1. These samples containing 0.5 percent azobisisobutyronitrile catalyst were placed in an 80° C. oven. The results of the experiments are listed in Table II. Samples 1–3 were removed from the oven after 8 hours whereas samples 4–6 were kept in the oven for 24 hours. The cooled polymer samples were recovered by first adding more solvent toluene then precipitating the polymer in methanol. The softening point of the polymer correlates well with the concentration of phenylvinylene carbonate in the polymer.

The softening points reported in Tables I and II were obtained by the method sometimes referred to as the stick point on hot block wherein a polymer specimen is stroked across a heated plate and the temperature at which the polymer produces a streak on the plate is detected.

TABLE II.—PHENYLVINYLENE CARBONATE (A)-STYRENE COPOLYMER

| Sample | Mole Fraction (A) in Monomers | Mole Fraction (A) in Polymers | Polymer Softening Point, °C. |
|---|---|---|---|
| 1 | 0 | 0 | 120 |
| 2 | 0.2 | 0.16 | 166 |
| 3 | 0.4 | 0.28 | 190 |
| 4 | 0.5 | 0.35 | 225 |
| 5 | 0.6 | 0.37 | 239 |
| 6 | 0.8 | 0.56 | 285 |

*Example 3*

Bulk copolymerization of styrene and phenylvinylene carbonate was conducted by placing sealed containers having 5 percent and 10 percent phenylvinylene carbonate and 95 percent and 90 percent respectively of styrene together with 0.1 percent azobisisobutyronitrile in an oil bath at 80° C. for 17 hours. Thereafter the bath was held at 120° C. for four hours. After cooling the products were dissolved in tetrahydrofuran then precipitated in methanol. The Vicat heat distortions of these two polymers designated as samples 1 and 2 in Table III are considerably higher than that of a styrene homopolymer prepared under similar conditions as sample 3.

TABLE III.—BULK COPOLYMERIZATION WITH PHENYLVINYLENE CARBONATE (A)

| Sample | Weight Percent (A) | Vicat H.D., °C. | Monomer Weight Percent |
|---|---|---|---|
| 1 | 5 | 121 | 95% Styrene. |
| 2 | 10 | 133 | 90% Styrene. |
| 3 | 0 | 90-95 | 100% Styrene. |

*Example 4*

Bulk copolymerization of a mixture containing 25 percent methyl methacrylate, 65 percent styrene and 10 percent phenylvinylene carbonate and 0.5 percent di-tert.-butylperoxide was effected by heating at 70° C. for two hours. The copolymer product was dissolved in tetrahydrofuran then reprecipitated in ethanol, filtered and dried. This copolymer had a Vicat heat distortion of 116° C.

Other monomer-phenylvinylene carbonate combinations were tested using the same procedure as in Example 4. The heat distortions of these copolymers listed as samples 1, 2, and 3 in Table IV show a substantial improvement over the heat distortions of the homopolymers designated as samples 1a, 2a and 3a.

TABLE IV.—BULK COPOLYMERIZATION WITH PHENYLVINYLENE CARBONATE (A)

| Sample | Weight Percent (A) | Vicat H.D., °C. | Monomer Weight Percent |
|---|---|---|---|
| 1 | 17 | 148 | 83% o-Chlorostyrene. |
| 1a | 0 | 107 | 100% o-Chlorostyrene. |
| 2 | 7.5 | 138 | 92.5% Methyl Methacrylate. |
| 2a | 0 | 120 | 100% Methyl Methacrylate. |
| 3 | 75 | 98 | 25% Methyl Vinyl Ketone. |
| 3a | 0 | 40 | 100% Methyl Vinyl Ketone. |

Other monomers having a vinylidene linkage were tested and found to copolymerize in bulk with phenylvinylene carbonate. A copolymer containing about 40 percent acrylonitrile appeared to have some crosslinking when polymerized in the presence of benzoyl peroxide catalyst. A copolymer containing about 44 percent α-methylstyrene, polymerized in the presence of azobisisobutyronitrile catalyst, was a somewhat crystalline product.

Additional physical properties of several of these polymers presented in Table V further illustrate the improvements which can be obtained by copolymerization with phenylvinylene carbonate.

TABLE V.—POLYMER PHYSICAL PROPERTIES

| Sample | Phenylvinylene Carbonate, Weight Percent | Styrene, Weight Percent | Heat Distortion, °C. | Izod Impact, ft.-lb./in. | Tensile, lbs./sq. in. | Elongation, Percent |
|---|---|---|---|---|---|---|
| 1 | 0 | 100 | [1] 98 | 0.49 | 4,816 | 1.0 |
| 2 | 12.6 | 87.4 | [1] 106 | 0.44 | 5,648 | 1.2 |
| 3 | 5 | 95 | [2] 103 | 0.42 | 7,800 | 2.2 |

[1] A.S.T.M. Method D648.
[2] Vicat Method.

Although copolymers containing as much as 99 percent phenylvinylene carbonate have been prepared, the properties of these polymers are not so desirable as those having between about one and 65 weight percent phenylvinylene carbonate and preferably between about two and 25 percent.

What we wish to claim as our invention is set out in the appended claims.

1. A normally solid copolymer produced by copolymerizing a mixture comprising essentially phenylvinylene carbonate and at least one monoethylenically unsaturated compound selected from the group consisting of acrylonitrile, styrene, o-chlorostyrene, α-methylstyrene, methyl methacrylate, methyl vinyl ketone and vinyl acetate, said polymerization being carried out in the presence of a free radical catalyst at a pressure corresponding substantially to the vapor pressure of the reaction mixture.

2. A copolymer according to claim 1 containing between about 1 and 65 weight percent of said phenylvinylene carbonate and between about 35 and 99 weight percent of said monoethylenically unsaturated compound.

3. A copolymer according to claim 1 containing from 2 to 25 weight percent of phenylvinylene carbonate.

4. The copolymer of claim 3 wherein said monoethylenically unsaturated compound is styrene.

5. The copolymer of claim 3 wherein said monoethylenically unsaturated compound is vinyl acetate.

6. The copolymer of claim 3 wherein said monoethylenically unsaturated compound is o-chlorostyrene.

7. The copolymer of claim 3 wherein said monoethylenically unsaturated compound is methyl vinyl ketone.

8. The copolymer of claim 3 wherein said monoethylenically unsaturated compound is a mixture containing from 25 to 35 percent methyl methacrylate and from 50 to 65 percent styrene.

References Cited

UNITED STATES PATENTS 2,722,525  11/1955  Price.
2,847,402  8/1958  Gluesenkamp.

FOREIGN PATENTS 1,044,104  11/1958  Germany.

OTHER REFERENCES

Morris: Journal of Organic Chemistry, vol. 27, April 1962, pp. 1451–1453 (Lib. Call No. QD 241J6).

WILLIAM H. SHORT, *Primary Examiner.*

L. P. QUAST, *Assistant Examiner.*